United States Patent
Suraci et al.

(10) Patent No.: US 11,770,072 B2
(45) Date of Patent: Sep. 26, 2023

(54) COMMONLY CONTROLLED BUCK-BOOST CONVERTER

(71) Applicant: Allegro MicroSystems, LLC, Manchester, NH (US)

(72) Inventors: Michele Suraci, Turate (IT); Giorgio Oddone, Aosta (IT)

(73) Assignee: Allegro MicroSystems, LLC, Manchester, NH (US)

( * ) Notice: Subject to any disclaimer, the term of this patent is extended or adjusted under 35 U.S.C. 154(b) by 121 days.

(21) Appl. No.: 17/510,759

(22) Filed: Oct. 26, 2021

(65) Prior Publication Data
US 2023/0128894 A1 Apr. 27, 2023

(51) Int. Cl.
H02M 3/158 (2006.01)
H02M 1/00 (2006.01)

(52) U.S. Cl.
CPC ....... H02M 3/1582 (2013.01); H02M 1/0025 (2021.05)

(58) Field of Classification Search
CPC ... H02M 3/1582; H02M 3/158; H02M 1/0025
See application file for complete search history.

(56) References Cited

U.S. PATENT DOCUMENTS

| | | | |
|---|---|---|---|
| 6,984,967 B2 | 1/2006 | Notman | |
| 7,560,917 B2 * | 7/2009 | Ho | H02M 3/158 323/288 |
| 7,649,325 B2 | 1/2010 | McIntosh et al. | |
| 9,291,478 B2 | 3/2016 | Contaldo et al. | |
| 9,614,428 B2 | 4/2017 | Garvey et al. | |
| 9,621,036 B2 | 4/2017 | Wibben | |
| 9,621,041 B2 | 4/2017 | Sun et al. | |
| 10,637,357 B1 * | 4/2020 | Zhan | H02M 3/157 |
| 2007/0075687 A1 * | 4/2007 | Ishii | H02M 3/1582 323/225 |
| 2008/0001587 A1 * | 1/2008 | Cremoux | H02M 3/1582 323/282 |

(Continued)

OTHER PUBLICATIONS

Allegro MicroSystems LLC Datasheet "A81407—Multi-Output Regulator with Buck or Buck-Boost Pre-Regulator, 4× LDO Outputs, Watchdog, 4× Gate Drivers, and SPI", Feb. 1, 2021, 58 pages.

*Primary Examiner* — Gustavo A Rosario-Benitez
(74) *Attorney, Agent, or Firm* — DALY, CROWLEY, MOFFORD & DURKEE, LLP (57) ABSTRACT

A method for controlling a buck-boost converter includes generating a first threshold voltage with a decreasing voltage level, generating a second threshold voltage with an increasing voltage level, and sensing an inductor current. A signal indicative of the sensed inductor current is compared to the first threshold voltage to control an on time of the high side buck switch and is compared to the second threshold voltage to control an off time of the high side boost switch. Also described is a controller including a compensator responsive to an output voltage feedback signal to generate a compensation voltage and a modulator having a buck signal path coupled to receive the compensation voltage and configured to control an on time of the high side buck switch and a boost signal path coupled to receive the compensation voltage and configured to control an off time of the high side boost switch.

11 Claims, 5 Drawing Sheets

(56) References Cited

U.S. PATENT DOCUMENTS

| | | | |
|---|---|---|---|
| 2012/0105030 A1* | 5/2012 | Chen ................... | H02M 3/156 323/271 |
| 2012/0153915 A1* | 6/2012 | Loikkanen .............. | G05F 1/618 323/283 |
| 2014/0043008 A1* | 2/2014 | Babazadeh .............. | G05F 3/02 323/304 |
| 2014/0197811 A1* | 7/2014 | Qiu ...................... | H02M 3/156 323/282 |
| 2017/0054363 A1 | 2/2017 | Mangtani et al. | |
| 2017/0155324 A1* | 6/2017 | Choquet ............. | H02M 3/1582 |
| 2019/0123650 A1* | 4/2019 | Ye ...................... | H02M 3/1582 |
| 2020/0295657 A1* | 9/2020 | Weiers ............... | H02M 3/1582 |
| 2022/0209663 A1* | 6/2022 | Wang ................... | H02M 1/08 |
| 2022/0209670 A1* | 6/2022 | Soleno ............... | H02M 3/1582 |

* cited by examiner

COMMONLY CONTROLLED BUCK-BOOST CONVERTER

CROSS REFERENCE TO RELATED APPLICATIONS

Not Applicable.

STATEMENT REGARDING FEDERALLY SPONSORED RESEARCH

Not Applicable.

FIELD

This disclosure relates generally to buck-boost converters and, more particularly, to four-switch non-inverting buck-boost converters with a common control topology.

BACKGROUND

Buck-boost converters have many applications due to the ability to regulate a positive voltage with increased accuracy despite significant input voltage variations that can be so large that the input voltage can go below the target output voltage. For example, such converters are often used in automotive applications, in which there can be significant battery voltage variation including abrupt battery voltage changes. Automotive applications impose demanding requirements of the converter and control integrated circuit (IC) due to the potentially harsh operating conditions through which functionality and compliance to strict safety specifications are critical. Other common applications for buck-boost converters are in battery-powered mobile applications and computing applications in which accurate and robust converter control are required.

SUMMARY

Described herein is a common control scheme for buck and boost portions of a buck-boost converter. A modulator is coupled to receive a compensation voltage from a compensator and includes a buck signal path to control an on time of the high side buck switch and a boost signal path to control an off time of the high side boost switch. The buck signal path and the boost signal path can implement current mode control with symmetrical slope compensation designed to maximize efficiency by ensuring only two switch transitions per switching cycle. The voltage control loop with a single compensator for both the buck and boost stages provides a simple and robust control topology and the described converter provides smooth transitions and fully automatic operation.

According to an aspect of the disclosure, a method for controlling a buck-boost converter having a high side buck switch coupled to a low side buck switch at a first switch node and a high side boost switch coupled to a low side boost switch at a second switch node, the buck-boost converter configured to have an inductor coupled between the first switch node and the second switch node, includes generating a first threshold voltage that has a decreasing voltage level and generating a second threshold voltage that has an increasing voltage level. The method further includes sensing a current through the inductor, comparing a signal indicative of the sensed inductor current to the first threshold voltage to generate a control signal to control an on time of the high side buck switch, and comparing the signal indicative of the sensed inductor current to the second threshold voltage to generate a control signal to control an off time of the high side boost switch.

Features may include one or more of the following individually or in combination with other features. A slope of the first threshold voltage is opposite in polarity with respect to a slope of the second threshold voltage. The slope of the first threshold voltage can be substantially equal in magnitude with respect to the slope of the second threshold voltage. The method can further include generating a feedback voltage based at least in part on an output voltage of the converter and applying compensation to the feedback voltage to generate a compensation voltage. Generating the first threshold voltage further can include adding an offset value to the compensation voltage to generate a first offset voltage and subtracting a ramp voltage from the first offset voltage to generate the first threshold voltage. Generating the second threshold voltage can include subtracting an offset value from the compensation voltage to generate a second offset voltage and adding a ramp voltage to the second offset voltage to generate the second threshold voltage. The buck-boost converter has a predetermined switching period and the offset voltage and the ramp voltage can be selected to cause the first threshold voltage and the second threshold voltage converge in a time interval substantially equal to the predetermined switching period so that, during each switching period, only two of the high side buck switch, the low side buck switch, the high side boost switch, and the low side boost switch commutate. Sensing the current through the inductor can include measuring a current through the high side buck switch when it is on and converting the measured current into the signal indicative of the sensed inductor current.

According to a further aspect of the disclosure, a controller for a buck-boost converter having a high side buck switch coupled to a low side buck switch at a first switch node and a high side boost switch coupled to a low side boost switch at a second switch node, the buck-boost converter configured to have an inductor coupled between the first switch node and the second switch node, includes a compensator responsive to a feedback signal based at least in part on an output voltage of the converter to generate a compensation voltage and a modulator. The modulator includes a buck signal path coupled to receive the compensation voltage and to generate a control signal to control an on time of the high side buck switch based at least in part on a current through the inductor and a boost signal path coupled to receive the compensation voltage and to generate a control signal to control an off time of the high side boost switch based at least in part on the current through the inductor.

Features may include one or more of the following individually or in combination with other features. The buck signal path can include a summation element configured to add an offset value to the compensation voltage to generate a first offset voltage and a subtraction element configured to subtract a ramp voltage from the first offset voltage to generate a first threshold voltage. The boost signal path can include a subtraction element configured to subtract the offset value from the compensation voltage to generate a second offset voltage and a summation element configured to add the ramp voltage to the second offset voltage to generate a second threshold voltage. The buck signal path can further include a first comparator configured to compare the first threshold voltage to a signal indicative of the current through the inductor and the boost signal path can further include a second comparator configured to compare the second threshold voltage to the signal indicative of the current through the inductor.

A slope of the first threshold voltage is opposite in polarity with respect to a slope of the second threshold voltage. The slope of the first threshold voltage can be substantially equal in magnitude with respect to the slope of the second threshold voltage. The buck-boost converter has a predetermined switching period and the offset voltage and the ramp voltage can be selected to cause the first threshold voltage and the second threshold voltage converge in a time interval substantially equal to the predetermined switching period. The signal indicative of the current through the inductor can be indicative of a current through the high side buck switch when the switch is on.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1:
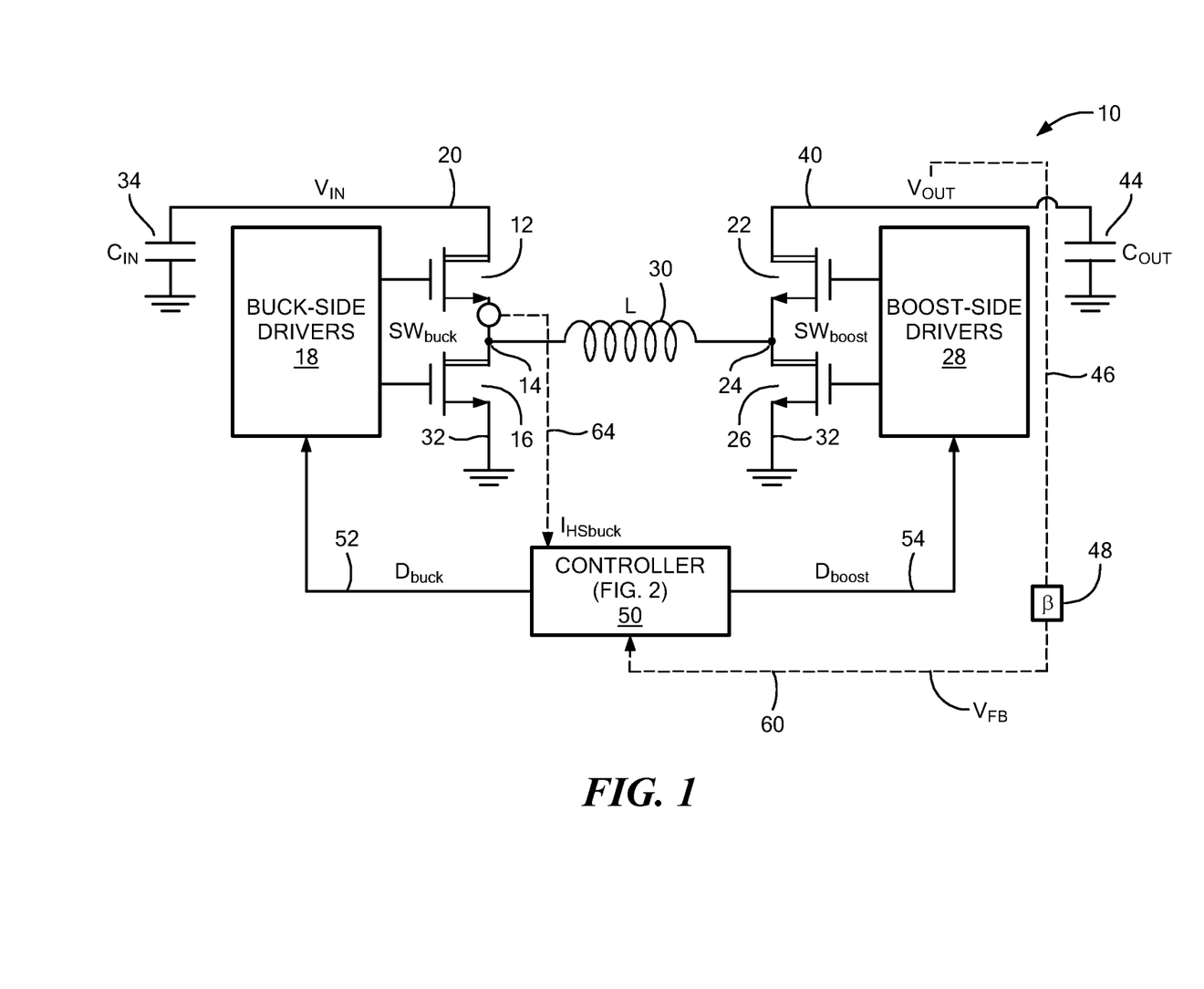
FIG. 1 is a block diagram of a buck-boost converter having a common controller for buck drivers and boost drivers according to the disclosure.

Referring to FIG. 1, a buck-boost converter 10 includes a high side buck switch 12 coupled to a low side buck switch 16 at a first switch node $SW_{buck}$ 14 and a high side boost switch 22 coupled to a low side boost switch 26 at a second switch node $SW_{boost}$ 24. The buck-boost converter 10 is configured to have an inductor 30 coupled between the first switch node 14 and the second switch node 24, as shown. The buck switches 12, 16 are coupled between an input voltage source $V_{IN}$ 20 and a ground reference potential 32. An input capacitor 34 can be coupled to the input voltage source 20, as shown. The boost switches 22, 26 are coupled between the converter output at which a regulated output voltage $V_{OUT}$ 40 is provided and ground 32. An output capacitor 44 can be coupled to the converter output 40, as shown.

According to the disclosure, a common control block, or simply controller 50 is configured to generate control signals for both the buck side switches 12, 16 and also for the boost side switches 22, 26. To this end, buck-side drivers 18 are coupled to receive a control signal $D_{buck}$ 52 from controller 50 and to generate control signals for buck switches 12, 16. Similarly, boost-side drivers 28 are coupled to receive a control signal $D_{boost}$ 54 from controller 50 and to generate control signal for boost switches 22, 26.

Figure 2:
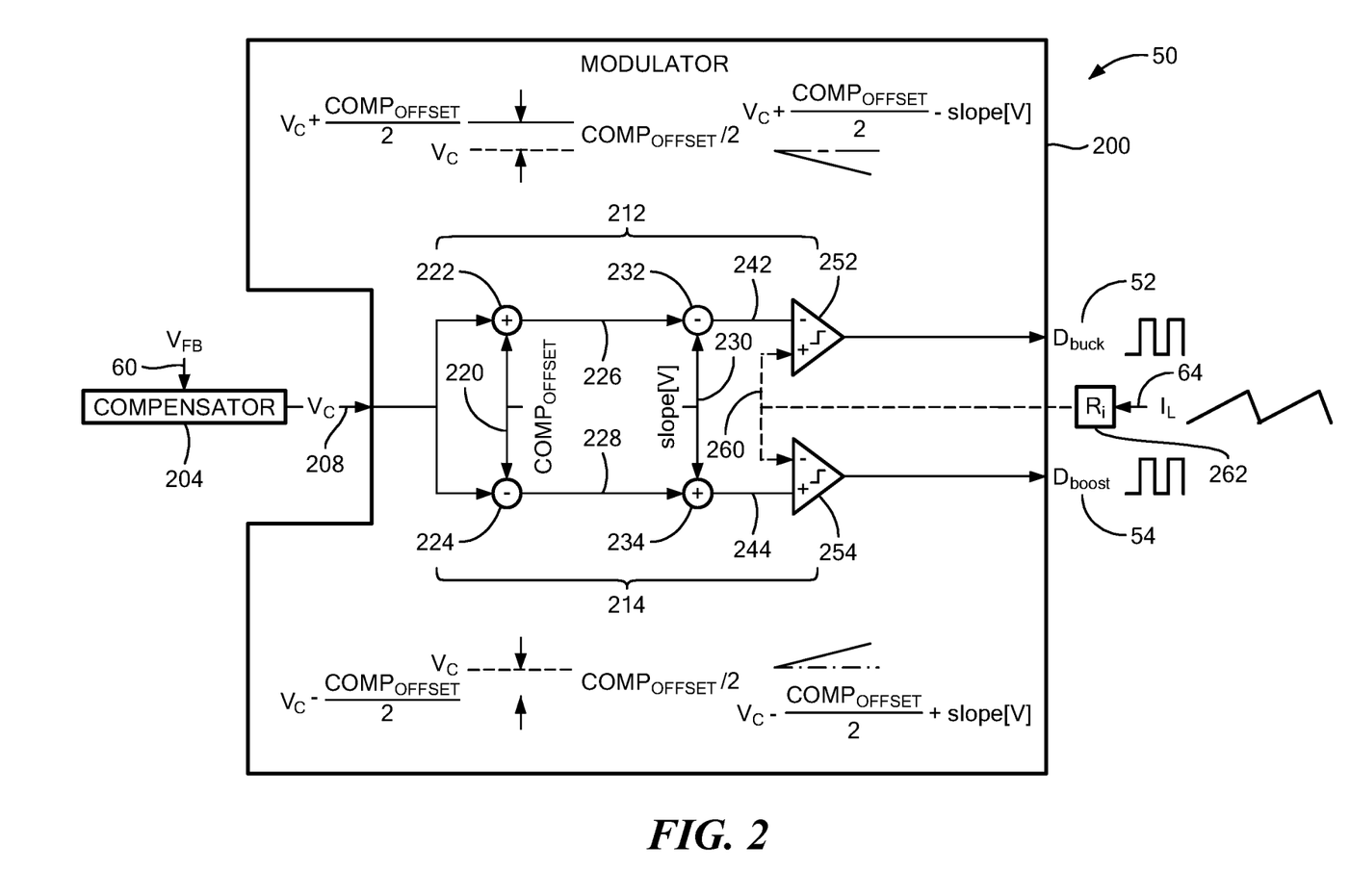
FIG. 2 shows the controller of FIG. 1 in greater detail according to the disclosure.

Controller 50 is shown in greater detail in FIG. 2. Suffice it to say here that controller 50 is coupled to receive a feedback voltage $V_{FB}$ 60 and a current sense signal $I_{HSbuck}$ 64. The current sense signal 64 is indicative of a current $I_L$ through the inductor 30. In an example embodiment, the current sense signal 64 is indicative of a current through the high side buck switch 12 when the switch is on and thus, this sensed inductor current can be represented as $I_{HSbuck}$, as shown. However, it will be appreciated by those of ordinary skill in the art that other schemes for sensing the inductor current $I_L$ are possible.

The feedback voltage 60 is based on the converter output voltage 40 and may be level-shifted by an element 48 to a reference voltage level, for example on the order of 1.0V. Various schemes are possible for implementing element 48, such as a resistive partition and, optionally, a feedforward capacitor to introduce a phase boost, for example.

Controller 50 can implement current mode control based on the current sense signal 64 and also can include a robust single voltage control loop based on the feedback signal 60, as will be described. The buck-boost converter topology of FIG. 1 can provide smooth transitions between operating regions and simplicity of the control methodology. For example, the converter 10 can provide smooth transitions between $V_{IN} > V_{OUT}$ and $V_{IN} < V_{OUT}$ regions during input voltage dropout conditions (i.e., good line regulation).

Figure 5:
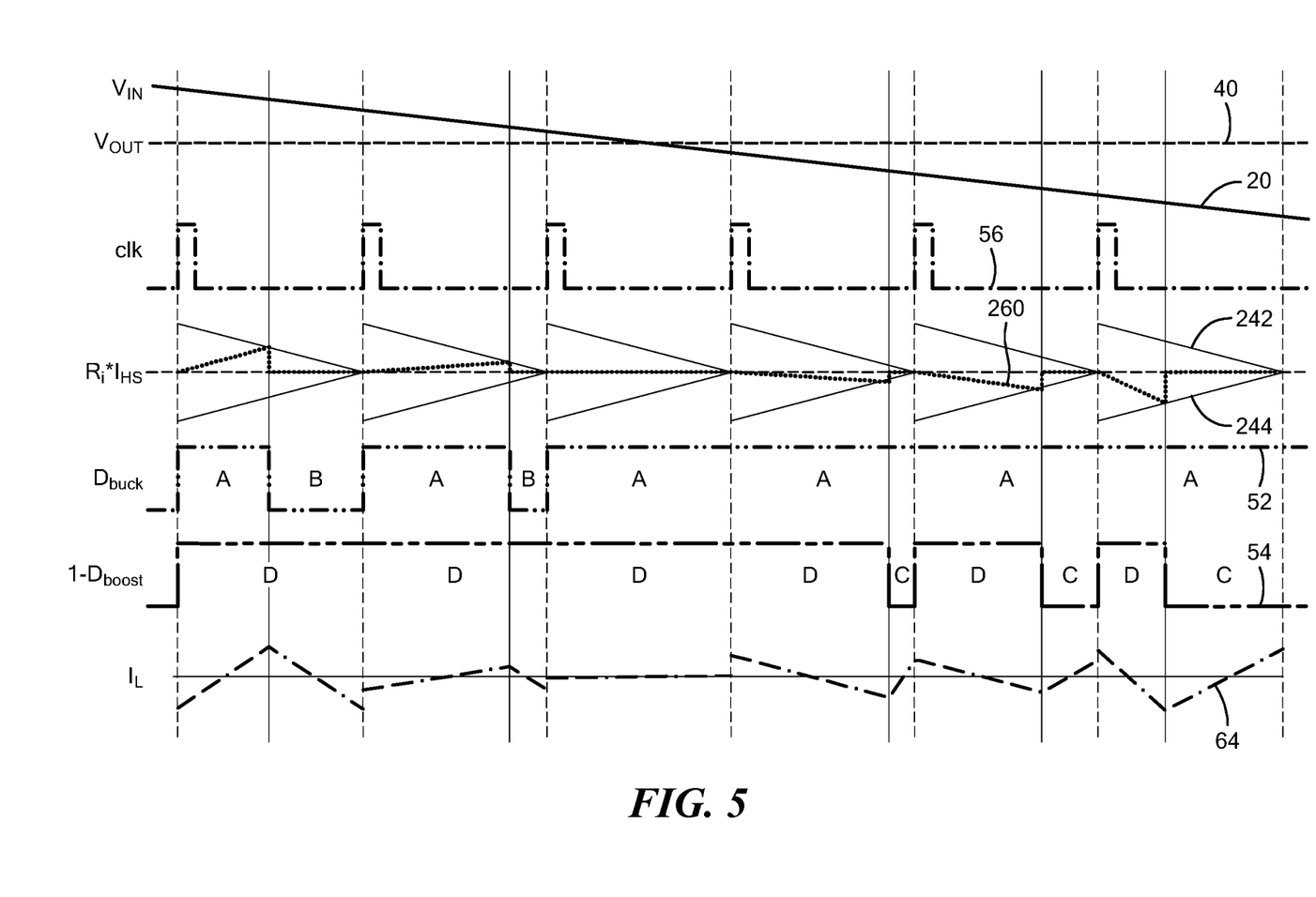
FIG. 5 shows example waveforms associated with the converter of FIGS. 1 and 2 according to the disclosure.

The converter 10 can operate at a predetermined switching frequency $f_{SW}$, as may be established by a clock signal 56 (FIG. 5). Thus, a predetermined switching cycle of the converter 10 can be given by $1/f_{SW}$, or $T_{SW}$. Operation at a fixed frequency can facilitate compliance with EMI regulations.

In an example embodiment, the input voltage 20 can range from 3.2V to 40.0V and the output voltage 40 can be approximately 5.35V.

In operation, as will be described further in connection with FIG. 4, depending on the input voltage level relative to the regulated output voltage level, the converter 10 automatically, or adaptively operates with either buck side switching or boost side switching For example, under certain conditions when the input voltage is greater than the output voltage 40, switch 22 is kept on and buck side switches 12, 14 are modulated at a buck duty cycle $D_{buck}$ and, when the input voltage 20 is less than the output voltage 40, switch 12 is kept on and boost side switches 22, 26 are modulated at a boost duty cycle $D_{boost}$. The buck duty cycle is given by $T_{ONbuck}/T$, where $T_{ONbuck}$ is the on time of high side buck switch 12 and the boost duty cycle $D_{boost}$ is given by the $T_{ONboost}/T$, where $T_{ONboost}$ is the on time of low side boost switch 26.

Referring also to FIG. 2, controller 50 includes a compensator 204 and a modulator 200. The compensator 204 is coupled to receive the feedback signal 60 (FIG. 1) and to generate a compensation voltage $V_C$ 208. Various compensation schemes may be implemented by compensator 204. For example, compensator 204 can be a type-II compensator that introduces two poles and one zero. It will be appreciated by those of ordinary skill in the art that other voltage control loop compensation schemes are possible.

The modulator 200 includes a buck signal path 212 coupled to receive the compensation voltage 208 and to generate control signal 52 to control an on time of the high side buck switch 12 (FIG. 1) based at least in part on the current through the inductor 30. Modulator 200 further includes a boost signal path 214 coupled to receive the compensation voltage 208 and to generate a control signal 54 to control an off time of the high side boost switch 22 based at least in part on the current through the inductor 30. Thus, the modulator 200 can be considered to regulate the peak current during the on-time for the buck conversion and the valley current during the off-time for the boost conversion.

The buck signal path 212 includes a summation element 222 configured to add an offset voltage 220 (i.e., COMP$_{OFFSET}$) to the compensation voltage 208 to generate a first offset voltage 226 and a subtraction element 232 configured to subtract a ramp voltage 230 (i.e., slope[V]) from the first offset voltage 226 to generate a first threshold voltage 242 that can be referred to as the buck threshold voltage. The buck signal path 212 further includes a first comparator 252 configured to compare the first threshold voltage 242 to a signal 260 indicative of the current through the inductor 30.

The boost signal path 214 includes a subtraction element 224 configured to subtract the offset voltage 220 from the compensation voltage 208 to generate a second offset voltage 228 and a summation element 234 configured to add the ramp voltage 230 to the second offset voltage 228 to generate a second threshold voltage 244 that can be referred to as the boost threshold voltage. The boost signal path 214 further includes a second comparator 254 configured to compare the second threshold voltage 244 to the signal 260 indicative of the current through the inductor.

The output of comparator 252 provides the control signal 52 to control the buck switches 12, 16 via the buck-side drivers 18 (FIG. 1) and the output of comparator 254 provides control signal 54 to control the boost switches 22, 26 via the boost-side drivers 28 (FIG. 1).

Signal 260 is generated by a sensing structure 262 that receives as an input the inductor current signal 64 (FIG. 1). The current sensing structure 262 is modeled by a resistance $R_i$ that generates the signal 260 as a voltage that is directly proportional to the sensed inductor current 64.

After either threshold 242, 244 is reached, the sensing structure 262 can be turned off so as to prevent spurious double switching inside a single switching period. This arrangement can increase predictability and robustness of the control scheme. Further, if a floating current sensing structure is used, a replicated, symmetric sensing structure can be used to enhance matching and improve performance if desired.

Figure 3:
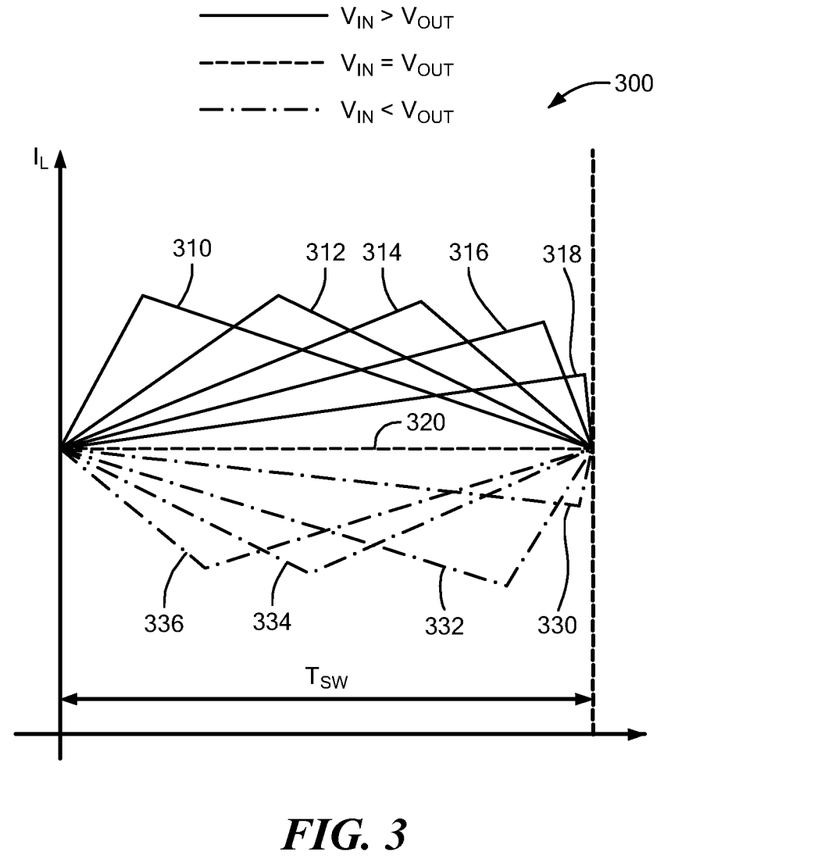
FIG. 3 illustrates inductor current versus time for various operating conditions including the input voltage being greater than the output voltage, equal to the output voltage, and less than the output voltage according to the disclosure.

With the illustrated modulator configuration, a slope of the first threshold voltage 242 is opposite in polarity with respect to a slope of the second threshold voltage 244. This arrangement leverages symmetry of the inductor current slope as illustrated by FIG. 3.

In some embodiments, the slope of the first threshold voltage 242 is substantially equal in magnitude and opposite in polarity with respect to the slope of the second threshold voltage 244. This arrangement is explained further in connection with FIG. 4 and provides improved efficiency by ensuring only two switch transitions per switching cycle.

Selection of the offset voltage 220 is described further below. Suffice it to say here that the offset voltage 220 can be expressed as:

$$COMP_{OFFSET} = \frac{S_{E_{BUCK}} + S_{E_{BOOST}}}{f_{SW}}$$

where $f_{SW}$ is the converter frequency, $S_{E_{BUCK}}$ is the slope of the buck threshold voltage 242, and $S_{E_{BOOST}}$ is the slope of the boost threshold voltage. Selection of the offset voltage 220 is arbitrary and can be made upon process and trimming availability. Advantageously, given the robustness of the described control, reasonable variations in this value will lead only to slightly different regulation performances.

The ramp voltage 230 can be selected based on the output voltage 40, inductor 30, and switching frequency values in a particular converter application. On this basis, ramp voltage 230 can have a predetermined, preset slope. Further the ramp voltage 230 can be trimmed, such as by use of programmable trim bits during operation.

As will be explained further, selection of the offset voltage 220 and the ramp voltage 230 can be coordinated to cause the first threshold voltage 242 and the second threshold voltage 244 converge in a time interval substantially equal to a predetermined switching period $T_{SW}$ of the converter 10.

Referring also to FIG. 3, plots 300 illustrate current through inductor 30 (FIG. 1) over a single switching cycle $T_{SW}$ for various operating conditions, including the input voltage 20 being greater than the output voltage 40, equal to the output voltage, and less than the output voltage. Thus, plots 300 have a horizontal axis illustrating time as may be in units of microseconds for example and a vertical axis illustrating inductor current in units of amps and include an arbitrary number of individual plots 310-336 illustrating different relationships between the input voltage 20 and output voltage 40.

Plots 310, 312, 314, 316 and 318 represent example inductor current waveforms when the input voltage 20 is greater than the output voltage 40, with each such plot illustrating a different input voltage level. Thus, plots 310, 312, 314, 316, and 318 can correspond to the converter 10 being in buck operation. Plot 310 can correspond to a highest level of input voltage 20 with respect to the plots 312-318 and plot 318 can correspond to a lowest level of input voltage 20 with respect to the plots 310-316 (while still being greater than the output voltage).

Plot 320 can represent inductor current when the input voltage 20 is substantially equal to the output voltage 40.

Plots 330, 332, 334, and 336 represent inductor current when the input voltage 20 is less than the output voltage 40, with each such plot illustrating a different input voltage level. Thus, plots 330, 332, 334, and 336 can correspond to the converter 10 being in boost operation. Plot 336 can correspond to a lowest level of input voltage 20 with respect to the plots 330-334 (while still being less than the output voltage 40) and plot 330 can correspond to a highest level of input voltage 20 with respect to the plots 332-336.

Buck operation plots 310, 312, 314, 316, and 318 correspond to inductor current slopes as follows:

$$I_L \text{ slope} \begin{cases} \frac{V_{IN} - V_{OUT}}{L} & \text{during } T_{ONbuck} \\ -\frac{V_{OUT}}{L} & \text{during } T_{OFFbuck} \end{cases}$$

Boost operation plots 330, 332, 334, and 336 correspond to inductor current slopes as follows:

$$I_L \text{ slope} \begin{cases} \frac{V_{IN}}{L} & \text{during } T_{ONboost} \\ \frac{V_{IN} - V_{OUT}}{L} & \text{during } T_{OFFboost} \end{cases}$$

Consideration of the inductor current slopes reveals that the inductor current has the same slope during $T_{ON_{buck}}$ and $T_{OFF_{boost}}$, but opposite sign, or polarity. The on phase of the buck side and the off phase of the boost side can be referred to as a "generic controlled time" and during this time, the inductor current has the same common slope given by $$\frac{V_{IN} - V_{OUT}}{L},$$

but with a changing sign at the $V_{IN}=V_{OUT}$ transition.

Modulator 200 is designed to leverage this parametrical symmetry of the inductor current slope during $T_{ON_{buck}}$ and $T_{OFF_{boost}}$ by applying symmetrical slope compensation. Further, modulator 200 has a continuous transfer function by which operation of the converter is automatic, or adaptive, or dynamic and also leverages use of a single compensator 204 for the two paths 212, 214.

Figure 4:
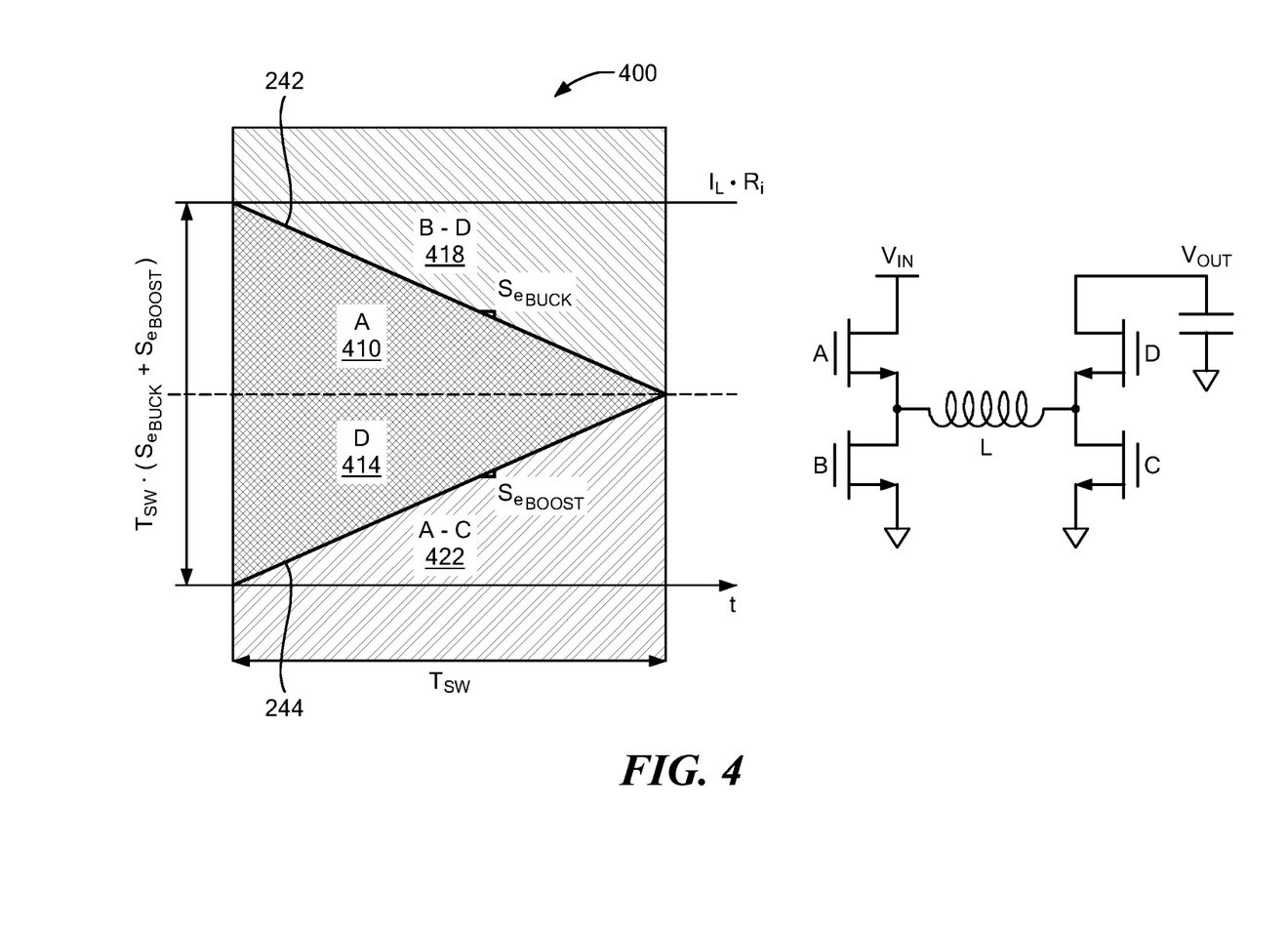
FIG. 4 illustrates modulator thresholds that define regions in which the sensed inductor current can be located during operation of the converter of FIGS. 1 and 2 according to the disclosure.

Referring also to FIG. 4, a plot 400 illustrates regions 410, 414, 418, 422 defined by the first and second threshold voltages 242, 244 (FIG. 2) in which the signal 260 (that is proportional to the inductor current) can be located during operation. The plot 400 has a horizontal axis illustrating time, as may be in units of microseconds for example, and a vertical axis illustrating the signal 260 (FIG. 2) that is directly proportional to inductor current (i.e., $I_L \cdot R_i$) and thus, can be in units of volts. Also labeled on the vertical axis is the offset voltage 220 (FIG. 2) given by:

$$T_{SW} \cdot (S_{E_{BUCK}} + S_{E_{BOOST}})$$

where $T_{SW}$ is the switching cycle, $S_{EBUCK}$ is the slope of the buck threshold 242, and $S_{EBOOST}$ is the slope of the boost threshold 244.

Also shown in FIG. 4 are converter buck switches A, B (as may be the same as or similar to buck switches 12, 16 of FIG. 1) and boost switches C, D (as may be the same as or similar to boost switches 22, 26 of FIG. 1). When inductor current sense signal 260 is in region 410 or in region 414, switches A and D are kept on. When signal 260 is in a buck region 418, switches B and D are kept on and when signal 260 is in a boost region 422, switches A and C are kept on.

Switch modulation occurs when the inductor current sense signal 260 transitions between regions.

The choice made of the parameters $COMP_{OFFSET}$, $S_{E_{BUCK}}$, $S_{E_{BOOST}}$ defines, for each generic controlled time, a certain a voltage-time characteristic with three specific operating regions of buck (region 418), boost (region 422), and buck-boost (collectively regions 410 and 418) for which the two comparators 4252, 254 will toggle.

According to the disclosure, these parameters are selected to have the falling buck threshold voltage 242 and the rising boost threshold voltage 244 meet or converge at a time substantially equal to a single switching cycle $T_{SW}$, as shown. With this arrangement, the sensed current signal 260 $R_i \cdot I_L$ will be uniquely located in one of three regions and there is no region for which it is possible to toggle more than two switches per switching period. This strict two switch turn on-off per period can be referred to as a mutual exclusion algorithm and advantageously optimizes converter efficiency by minimizing gate charge and switching losses and provides for a smooth efficiency versus input voltage profile (i.e., without jumps or hysteresis regions around $V_{IN}=V_{OUT}$).

Referring also to FIG. 5, example waveforms associated with operation of the converter 10 are shown. In particular, a falling input voltage 20 is shown in relation to the regulated output current. Clock signal 56 includes pulses illustrating commencement of switching cycles.

Signal 260 that is directly proportional to the sensed inductor current 64 (FIG. 1) is shown in relation to the falling buck threshold voltage 242 and the rising boost threshold voltage 244. The buck control signal 52 has portions at a logic high level corresponding to an on time of buck switch A (FIG. 4) or switch 12 (FIG. 1) and portions at a logic low level corresponding to an on time of buck switch B (FIG. 4) or switch 16 (FIG. 1). The boost control signal 54 has portions at a logic high level corresponding to an on time of boost switch D (FIG. 4) or switch 22 (FIG. 1) and portions at a logic low level corresponding to an on time of boost switch C (FIG. 4) or switch 26 (FIG. 1). Also shown is the inductor current 64 as may be sensed as the current through the high side buck switch when it is on.

Consideration of the control signals 52, 54 during the time when the input voltage 20 is greater than the output voltage 40 reveals that signal 260 is in region 414 of FIG. 4, with switch D is always on and switches A and B are modulated at the buck duty cycle $D_{BUCK}$. During the time when the input voltage 20 becomes less than the output voltage, signal 260 is in region 410 of FIG. 4, with switch A always on and switches C and D modulated at the boost duty cycle $D_{BOOST}$.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for controlling a buck-boost converter comprising a high side buck switch coupled to a low side buck switch at a first switch node and a high side boost switch coupled to a low side boost switch at a second switch node, the buck-boost converter configured to have an inductor coupled between the first switch node and the second switch node, the method comprising:
   generating a feedback voltage based at least in part on an output voltage of the converter; and
   applying compensation to the feedback voltage to generate a compensation voltage;
   generating a first threshold voltage that has a decreasing voltage level, comprising:
   adding an offset value to the compensation voltage to generate a first offset voltage; and
   subtracting a ramp voltage from the first offset voltage to generate the first threshold voltage;
   generating a second threshold voltage that has an increasing voltage level, comprising:
   subtracting an offset value from the compensation voltage to generate a second offset voltage; and
   adding a ramp voltage to the second offset voltage to generate the second threshold voltage;
   sensing a current through the inductor;
   comparing a signal indicative of the sensed inductor current to the first threshold voltage to generate a control signal to control an on time of the high side buck switch; and comparing the signal indicative of the sensed inductor current to the second threshold voltage to generate a control signal to control an off time of the high side boost switch.

2. The method of claim 1, wherein a slope of the first threshold voltage is opposite in polarity with respect to a slope of the second threshold voltage.

3. The method of claim 2, wherein the slope of the first threshold voltage is substantially equal in magnitude with respect to the slope of the second threshold voltage.

4. The method of claim 1, wherein the buck-boost converter has a predetermined switching period and wherein the first threshold voltage and the second threshold voltage converge in a time interval substantially equal to the predetermined switching period so that, during each switching period, no more than two of the high side buck switch, the low side buck switch, the high side boost switch, and the low side boost switch toggle.

5. The method of claim 1, wherein sensing the current through the inductor comprises measuring a current through the high side buck switch when it is on and converting the measured current into the signal indicative of the sensed inductor current.

6. A controller for a buck-boost converter comprising a high side buck switch coupled to a low side buck switch at a first switch node and a high side boost switch coupled to a low side boost switch at a second switch node, the buck-boost converter configured to have an inductor coupled between the first switch node and the second switch node, the controller comprising:
 a compensator responsive to a feedback signal based at least in part on an output voltage of the converter to generate a compensation voltage; and
 a modulator comprising:
  a buck signal path comprising a summation element configured to add an offset value to the compensation voltage to generate a first offset voltage and a subtraction element configured to subtract a ramp voltage from the first offset voltage to generate a first threshold voltage, wherein the buck signal path is coupled to receive the compensation voltage and to generate a control signal to control an on time of the high side buck switch based at least in part on a current through the inductor and a first threshold voltage having a first slope; and
  a boost signal path comprising a subtraction element configured to subtract the offset value from the compensation voltage to generate a second offset voltage and a summation element configured to add the ramp voltage to the second offset voltage to generate a second threshold voltage, wherein the boost signal path is coupled to receive the compensation voltage and to generate a control signal to control an off time of the high side boost switch based at least in part on the current through the inductor and a second threshold voltage having a second slope.

7. The controller of claim 6, wherein the buck signal path further comprises a first comparator configured to compare the first threshold voltage to a signal indicative of the current through the inductor and wherein the boost signal path further comprises a second comparator configured to compare the second threshold voltage to the signal indicative of the current through the inductor.

8. The controller of claim 7, wherein a slope of the first threshold voltage is opposite in polarity with respect to a slope of the second threshold voltage.

9. The controller of claim 8, wherein the slope of the first threshold voltage is substantially equal in magnitude with respect to the slope of the second threshold voltage.

10. The controller of claim 6, wherein the buck-boost converter has a predetermined switching period and wherein the first threshold voltage and the second threshold voltage converge in a time interval substantially equal to the predetermined switching period.

11. The controller of claim 6, wherein the signal indicative of the current through the inductor is indicative of a current through the high side buck switch when the switch is on.

* * * * *

UNITED STATES PATENT AND TRADEMARK OFFICE
CERTIFICATE OF CORRECTION

PATENT NO. : 11,770,072 B2
APPLICATION NO. : 17/510759
DATED : September 26, 2023
INVENTOR(S) : Michele Suraci et al.

It is certified that error appears in the above-identified patent and that said Letters Patent is hereby corrected as shown below:

In the Specification

Column 3, Line 11 delete "converge" and replace with --to converge--.

Column 3, Line 63 delete "signal" and replace with --signals--.

Column 4, Line 38 delete "switching For example," and replace with --switching. For example,--.

Column 5, Line 25 delete "252provides" and replace with --252 provides--.

Column 7, Line 42 delete "a certain a" and replace with --a certain--.

Column 7, Line 46 delete "4252, 254" and replace with --252, 254--.

Signed and Sealed this
Eighth Day of October, 2024

Katherine Kelly Vidal
*Director of the United States Patent and Trademark Office*